United States Patent [19]
Eidson

[11] Patent Number: 5,978,753
[45] Date of Patent: Nov. 2, 1999

[54] CONTEXT PARAMETERS FOR ESTABLISHING DATA COMMUNICATION PATTERNS IN A DISTRIBUTED CONTROL AND MEASUREMENT SYSTEM

[75] Inventor: John C Eidson, Palo Alto, Calif.

[73] Assignee: Hewlett-Packard Company, Palo Alto, Calif.

[21] Appl. No.: 08/819,893

[22] Filed: Mar. 18, 1997

[51] Int. Cl.⁶ ................................................... G05B 23/02
[52] U.S. Cl. .......................... 702/188; 702/187; 702/189; 364/138; 340/825.06
[58] Field of Search ..................................... 702/187, 188, 702/119, 186, 189; 340/825.06, 825.07, 825.08; 364/138

[56] References Cited

U.S. PATENT DOCUMENTS

| | | | |
|---|---|---|---|
| 4,658,370 | 4/1987 | Erman et al. | 706/60 |
| 5,717,614 | 2/1998 | Shad et al. | 702/186 |

*Primary Examiner*—John Barlow
*Assistant Examiner*—Hien Vo
*Attorney, Agent, or Firm*—Pamela Lau Kee

[57] ABSTRACT

A method for initializing a distributed measurement and control system that establishes communication bindings based on context parameters measured or acquired by the nodes.

11 Claims, 6 Drawing Sheets

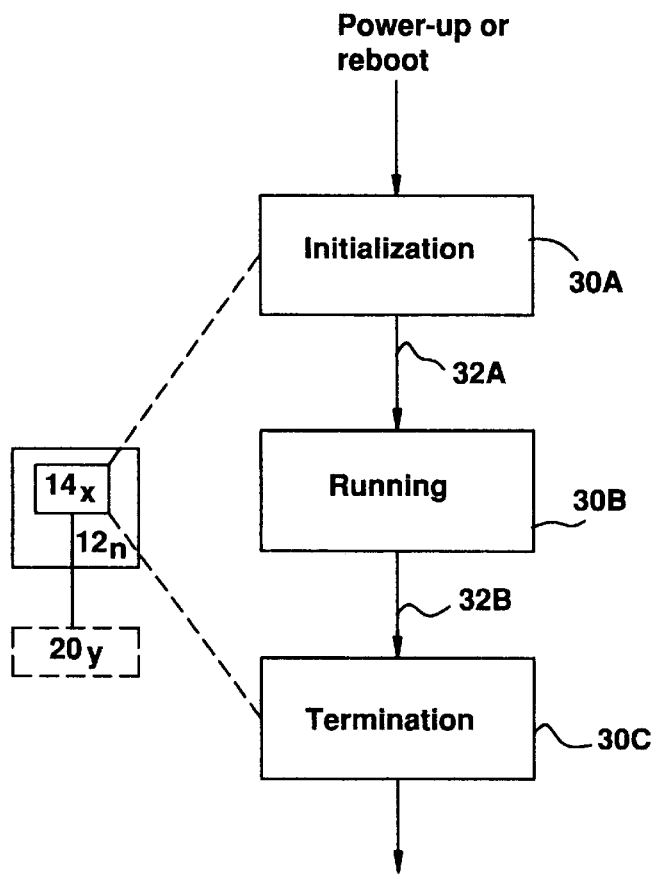
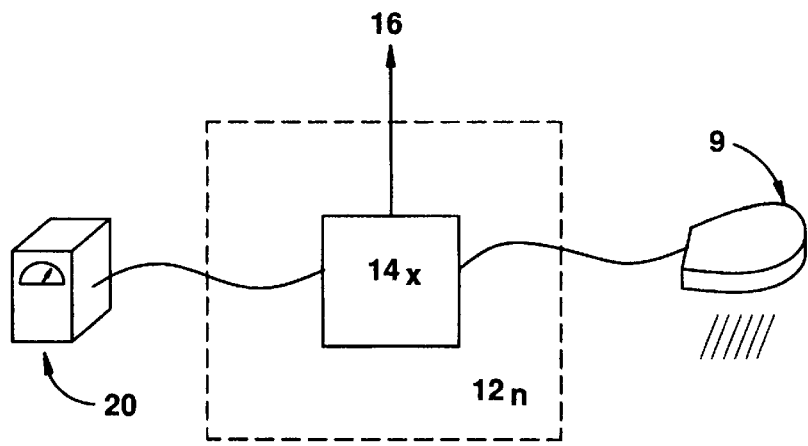

FIG.5B

Specification message:
Specification 1:
GUI Name: printf("Control loop at %d", Virtual_node_app-tag)
Information_tag:=Virtual_node_app_tag,node-apptag
Virtual_node_app_tag:=location where units=pascals
Node_app_tag :=units
Virtual_node_app:= communicate with TTL = 0 (alternatively communicate with peers)
Node Application Data:= {Information_tag, value, units, time}
Virtual Node Application Data := {virtual_node_app_tag, value,time}

Specification 2:

40 ⌇ operational message examples:
data from Node application IA: {1.25, deg C, 153, deg C, 13:00} (e.g. the value is 153 deg C at 1PM)
data from Node application 5: {4.5, newtons 32, newtons, 14:00} (e.g. the value is 32 newtons at 2PM)
data from Virtual noded application A: {1.25, payload value, 15:00 } (e.g. the payload value was assembled at 3PM)

Specification message:
Specification 1:
GUI Name: printf("Control loop at %d", Virtual_node_app_tag)
Information_tag:=UUID
Virtual_node_app_binding:= UUID-i, Virtual_node_app_tag, node_app_tag
Node_app_binding:= UUID-j, Virtual_node_app_tag, node_app_tag
Virtual_node_app_tag := location where units = pascals
node_app_tag := units
Virtual_node_app:= communicate with TTL = 0 (alternatively communicate with peers)
Node Application Data:= {Information_tag, value, units, time}
Virtual Node Application Data := {virtual_node_app_tag, value,time}

40

Binding message examples:
binding from Node application IA: {2317, 1.25, deg C} (e.g. the UUID is 2317 for 1.25, deg C)
binding from Node application 5: {4317, 4.5, newtons} (e.g. the UUID is 4317 for 4.5, newtons)
binding from Virtual node application A: {2259, 1.25} (e.g. the UUID is 2259 for 1.25)

42

Operational message examples:
data from Node application IA: {2317, 153, deg C, 13:00} (e.g. the value is 153 deg C at 1PM)
data from Node application 5: {4317, 32, newtons, 14:00} (e.g. the value is 32 newtons at 2PM)
data from Virtual node application A: {2259, payload value, 15:00} (e.g. the payload value was assembled at 3PM)

45

"UUID used in combonation with the enviromental
parameters as the information tag"

CONTEXT PARAMETERS FOR ESTABLISHING DATA COMMUNICATION PATTERNS IN A DISTRIBUTED CONTROL AND MEASUREMENT SYSTEM

FIELD OF THE INVENTION

The invention is directed towards the field of the measurement and control systems. In particular, the invention is in the area of automated configuration of smart sensors and actuators used in measurement and control systems.

BACKGROUND OF THE INVENTION

Many measurement and control applications are solved by using a central controller, in conjunction with remotely located sensors or actuators. In the past, these transducers were connected to the central controller, via a point-to-point link, either an analog, e.g. a 4–20 ma loop, or a digital link such as a RS-232. Recently, a number of "fieldbusses" have emerged that allow these devices to share a packet-based bus or network for communication to the central controller. In principle, these networks also allow peer-to-peer communication, where one smart device communicates directly to another. These networks establish the communication patterns over this shared media using addressing schemes, a process known as "binding".

The binding process modifies configuration tables in one or more computer components (system nodes), such that information packets placed on the network by an application executing on one node (node application) are correctly received by other applications. Most systems use a tag-based architecture for binding, where each network visible entity generated by these node applications is given a unique name. The binding occurs by properly associating the tags of sending and receiving entities and mapping these associations onto the addressing scheme of the underlying network protocol. Most network vendors have installation tools used to accomplish this binding. The installation tool methodology depends upon whether the binding occurs at design time, at commission time, or dynamically when components are replaced or the system is modified.

Except for systems where the bindings occur at design time, these tools typically access the network from a separate computer and individually access the distributed nodes for identification purposes. At a minimum, the factory built-in unique address (UUID) of each node is determined so that the tools can communicate with the device to modify the address tables. At the field level, the tools are implemented in lap-top computers or special purpose handheld devices, often in concert with a simple physical interface, e.g. a button on the remote component. If the node is akin to a computer, then the tools are often part of a separate user interface resident on the processor.

In all cases, the binding process requires specific design information about the global application which determines the communication among the applications executing on the distributed nodes. Typically for initial installation, this involves manual entry and often requires that this information and the resulting bindings be maintained in a form accessible to the tools in the event that system modifications are necessary. These tools usually require users who are computer literate and possess a detailed understanding of the application.

For distributed measurement and control systems, many application specific details for binding concern the identification of specific transducers, i.e. sensors and actuators, with some aspect of the physical world. To illustrate, the system must be aware which pressure sensor is measuring the pressure of boiler-1, as opposed to another point in the system. Since the pressure of boiler-1 is of interest at various points in the system, the information must be consistent system wide. Large systems are often hierarchical. As a result, the binding process is repeated at various levels of the system with different naming schemes. Again, the installers must properly match the names across these boundaries so that at all points of interest the pressure of boiler-1 is uniquely identified. In addition, distributed systems must establish communication patterns among collections of node applications (virtual node applications) that in concert behave as a larger application. Like a single application, collections can form hierarchies or other patterns that need a binding process.

SUMMARY OF THE INVENTION

The method and architecture establishes communication patterns among applications, individually and collectively, on a system of distributed components with minimal manual entry at installation. In addition, these systems are easy to modify when components require replacement since these techniques simplify the establishment of bindings reflecting new or deleted components of the system.

For all applications, the essence of the binding process is creating names for each visible entity to reflect the relationship of that entity to the real world application. These names are described in a human readable form and mapped onto more efficient unique machine readable unique identifiers. The generation of logically distinct application-related names is enhanced by this invention.

In this architecture, the distinct names, e.g. boiler_1_pressure, are replaced by a collection of attributes, termed "context parameters", that collectively specify the same logical relationship to the real world application. Context parameters may include name, location, units, aggregate or operational parameters, and time. The node applications apply application specific constraints to the context parameters to describe a unique logical binding statement that logically admits only the desired relationship to the physical world, and use these constraint-based specifications as the basis for establishing the communication patterns.

The system nodes include procedures that permit the node applications to access the context parameters. Since the parameters reflect an aspect of the relationship of the application to the physical world, the procedures must include a measurement capability, e.g. transducers used for the operational aspects of the application. The procedures should include as many context parameters as necessary and practical to reduce manual entry during the binding process, e.g. the physical location of the component, features of transducer measurements associated with the component, local time, the values of measured properties of the physical world, UUIDs, etc.

Proper selection of context parameters and the constraints allows application specificity without the extensive use of ad hoc application specific names. Instead of ad hoc names, most context parameters will use standard domain definitions e.g. GPS coordinates, or application domain standard definitions or names, e.g. "differential-pressure".

The binding process consists of the node acquiring the desired context parameters. System designers may tag information with these values which all recipients can use as the basis for selecting, in a flexible manner, information based on the same application defined constraints. Alternatively, the acquiring node can generate a UUID that represents the logical equivalent of the application of the constraints to the context parameters. This pairing of context parameters and generated UUID is then shared with all potentially interested node applications. After binding, the data can be identified based on the UUID. The binding process for collections occurs in a similar fashion. Constraints are defined that when applied to the context parameters acquired by potential members of the collection logically define the collection, e.g. all nodes that measure units of Pascals (pressure) that communicate with each other over the network without passing through any routers.

A node application enters an initialization state upon power-up or "re-booting" of the component. After the initialization, code is executed and the node application enters the running state. The node application continues in the running state until an "exit" procedure is initiated, at which point, the termination state is entered. The termination state allows a node application to systematically place resources in an appropriate condition before ceasing execution. The termination state may also be used to modify binding conditions in the system.

The binding process is normally executed during the initialization phase. If the system allows dynamic modification, the binding process may be repeated on some subset of the nodes during the execution phase. Dynamic binding is more readily implemented using the context parameters as the tag rather than the UUID since there is no need for the extra communication message required to share the UUID context parameter binding.

BRIEF DESCRIPTION OF THE DRAWINGS

FIG. 2 illustrates a state diagram associated with a node application.

FIG. 3 illustrates a typical node showing example means for acquiring context parameters.

FIG. 6 illustrates the option of using a UUID in combination with the context parameters as the information tag.

DETAILED DESCRIPTION OF THE PREFERRED EMBODIMENTS

Figure 1:
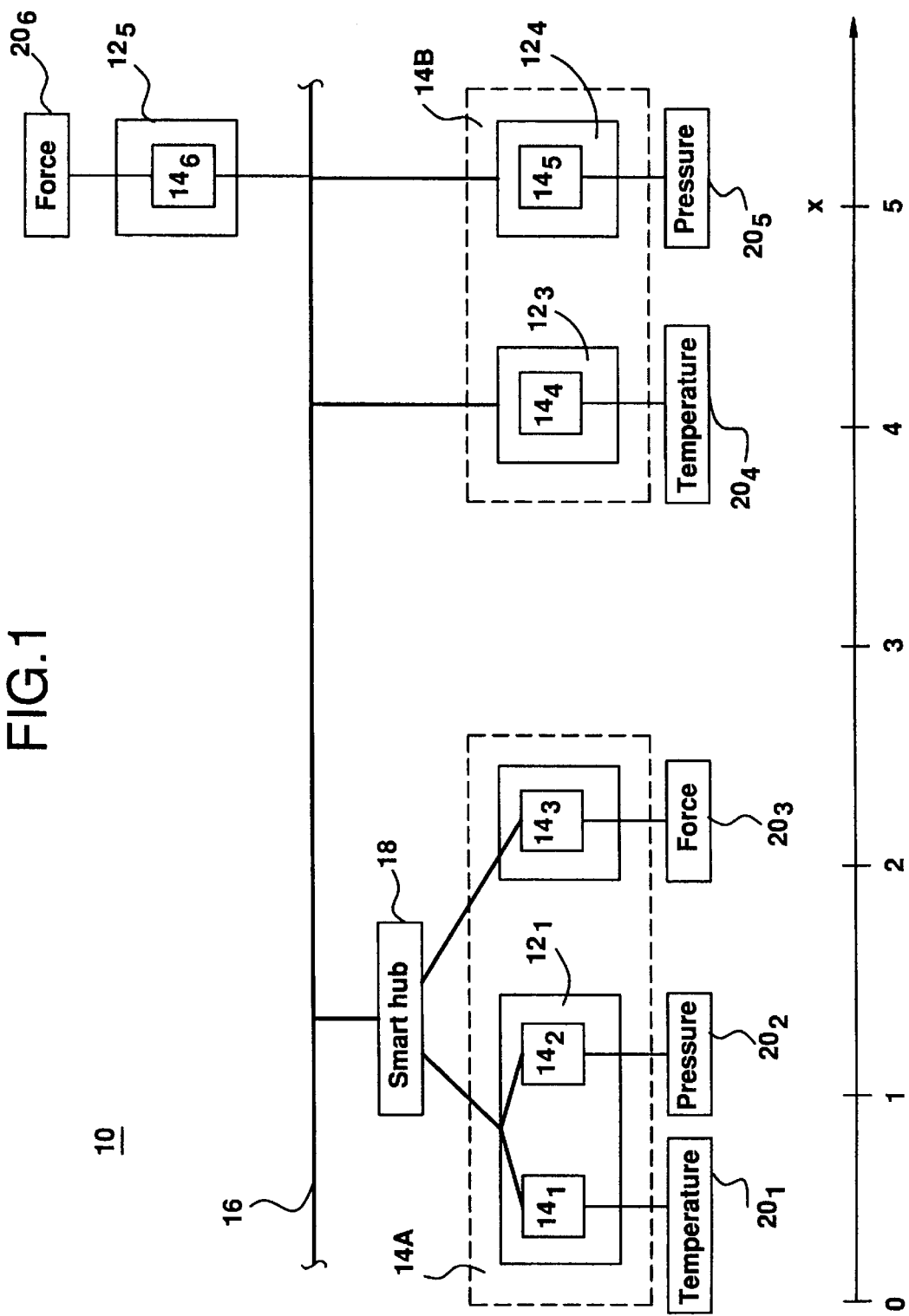
FIG. 1 illustrates a typical distributed measurement and control system.

FIG. 1 illustrates a typical distributed system 10. The system consists of one or more components $12_n$, each executing one or more node applications $14_x$. Typical systems may optionally include a virtual node application 14A that describes a cooperative behavior among node applications $14_1$, $14_2$, and $14_3$. The actual code or execution of the virtual node application 14A takes place as part of any or all of the constituent node applications and the distribution may vary with time. Each node application $14_x$, via the infrastructure of the supporting component communicates over a network 16. For components $12_1$, and $12_2$, communication to the entire system is via a smart hub 18. Alternatively, a node application $14_x$ may have an associated transducer $20_y$, that either measures or changes some physical world quantity.

An overall application running on this system uses the information generated or consumed by each node application to carry out the intended real world function such as controlling or monitoring a series of boilers. The binding process consists of producing tag information which properly identifies this data in terms of the relationship to the physical world. For example, if virtual node application 14A needs to know the force at component $12_2$, the installation process must insure that the data from components $12_2$ and $12_5$ can be distinguished.

FIG. 2 illustrates the overall behavior of each node application in terms of this binding process. A typical node application $14_x$ passes through three major states: initialization 30A, running 30B, and termination 30C, with transitions 32A, 32B between the states. Upon power-up or reboot of the underlying component, the node application $14_x$ enters the initialization state 30A. During initialization, the node application $14_x$ executes the binding process in addition to other initialization functions. At the completion of the initialization state 30A, the node application $14_x$ transitions into the running state 30B via transition 32A. The running state 30B is the normal operating state of the node application $14_x$ in which the node application cooperates with other node applications to achieve the overall designed system functionality. If the system is designed to allow various modifications which require rebinding during the operational phase, the relevant portion of the binding process is repeated as required. At the conclusion of the operational or running state, the node application $14_x$ transitions into the termination state 30C via transition 32B. In the termination state 30C, the node application $14_x$ may notify other node applications that it is leaving the system, that is to "unbind" the visible portions of the node application $14_x$.

The initial step in the binding process is the acquisition of the relevant context parameters. FIG. 3 illustrates the construction of nodes in the architecture of this invention which allows this to be done. Shown is a typical component $12_n$ that contains a node application $14_x$, which may have an associated transducer 20, and which communicates with the rest of the system over the network, 16. In addition, each node application $14_x$ has access to the necessary context parameter transducers 9, that are used to acquire the relevant context parameters. Thus, each node has potentially three distinct mechanisms for determining the relevant features of the environment needed to meet the binding specifications: the context parameter transducers 9, the operational transducers 20, and the network 16. These three mechanisms provide different levels of data.

The operational transducers 20 provide specification data which defines the operational purpose of the device, such as the units of measure, as well as values derived from the physical world in the case of sensors. The data concerning the device may be defined using electronic data sheet methods such as specified in IEEE Draft Standard 1451.2.

The network 16 allows the receipt of specifications from other devices and the ability to determine some aspects of the communication topology which may be used to define the structure of the overall system. For example, referring to FIG. 1, if the smart hub 18 does not pass messages with certain parameters to the higher level of the system 10, then the node applications in components $12_1$, and $12_2$ can determine the members of virtual node application 14A on this basis and can exchange the binding data needed to establish virtual node application 14A. Without the use of the smart hub, some other specification for "14A" such as all nodes located between X=0, and X=3 could be used. In either case, the application designer uses this data to distinguish "14A" from some similar application operating on a different aspect of the physical world. The smart hubs may be ordinary routers with a time-to-live of zero using multicast communication in an Ethernet-based network.

Alternatively, the hub or router could key off some other header information in the messages to be used for establishing binding.

The context parameter transducers 9 acquire the remaining data needed for binding that is not available from the other two sources. This access is through the normal I/O structures for typical microprocessors. The nature of these transducers varies from application $14_x$ to application $14_x$. In many applications, the binding requires specification of the physical location associated with a node or collection. Thus, one common context parameter transducer measures the physical location in an application meaningful way, e.g. for an context monitoring application, a GPS-based transducer measures longitude, latitude, and elevation. In a building control application, the location may be measured using:

- acoustic devices that interact with beacons at known locations within a room
- acoustic or optical devices that receive coded transmissions confined to the defining spaces and which differ from space to space. These devices may be use passive technology such as the receipt of broadcasted information or active technology such as bar code readers.
- similar techniques apparent to those skilled in the art of measuring location.

In process situations, the binding techniques may be used in conjunction with finer grained information, e.g. coded mounts which can be interrogated.

Figure 4:
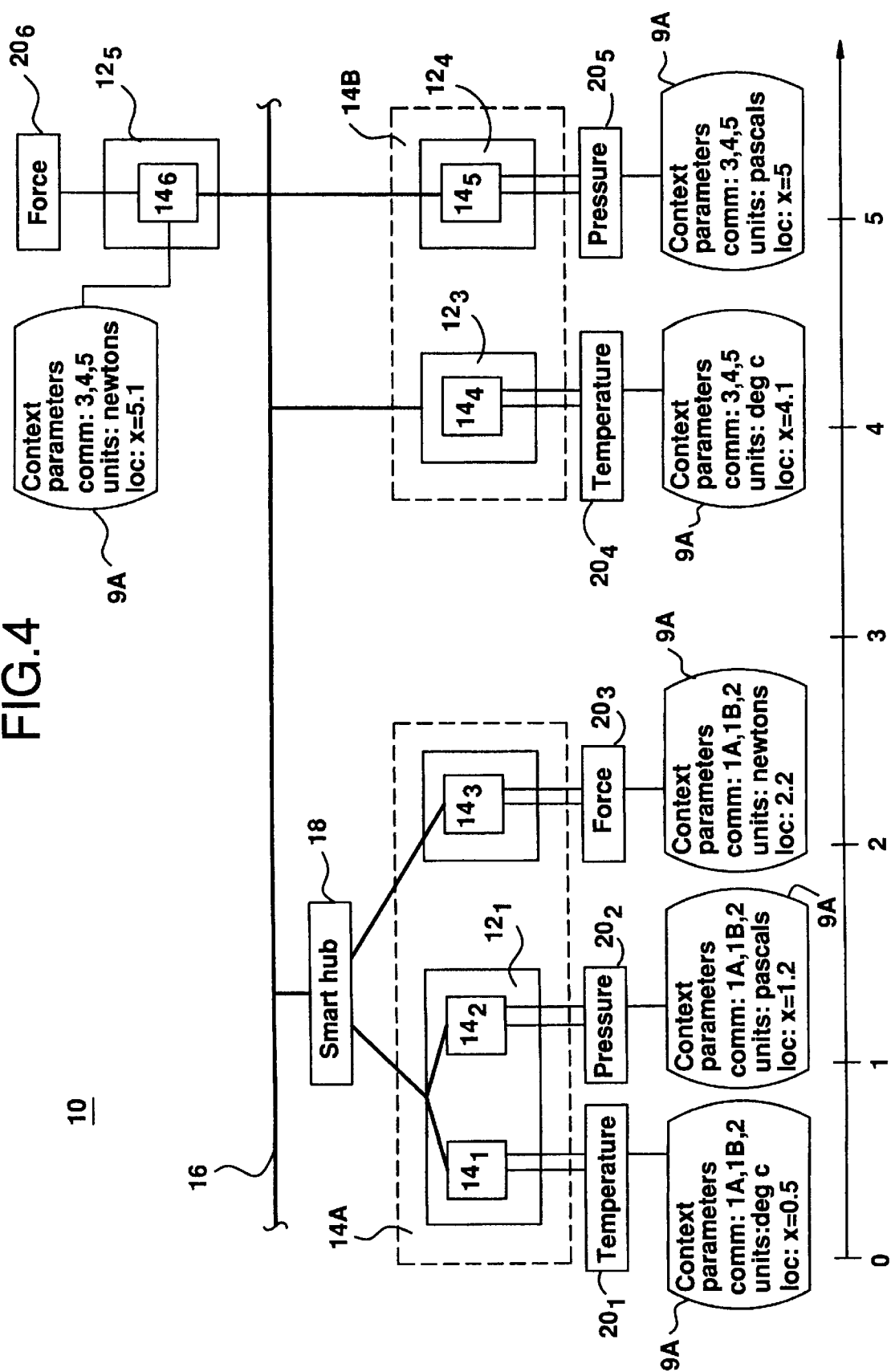
FIG. 4 illustrates the 'acquire context parameters' phase of the binding process.

FIG. 4 illustrates one method of acquiring the context parameters for the system shown in FIG. 1. The context parameter transducer 9 measures the location as each component $12_n$ along some dimension 'X'. Shown for each node application $14_x$, are the context parameter values 9A (see FIG. 4) determined for this sample application $14_x$. The electronic data sheet of the associated operational transducer is used to determine the "units". The communication topology which includes the smart hub defines the "communication" parameter.

Figure 5A:
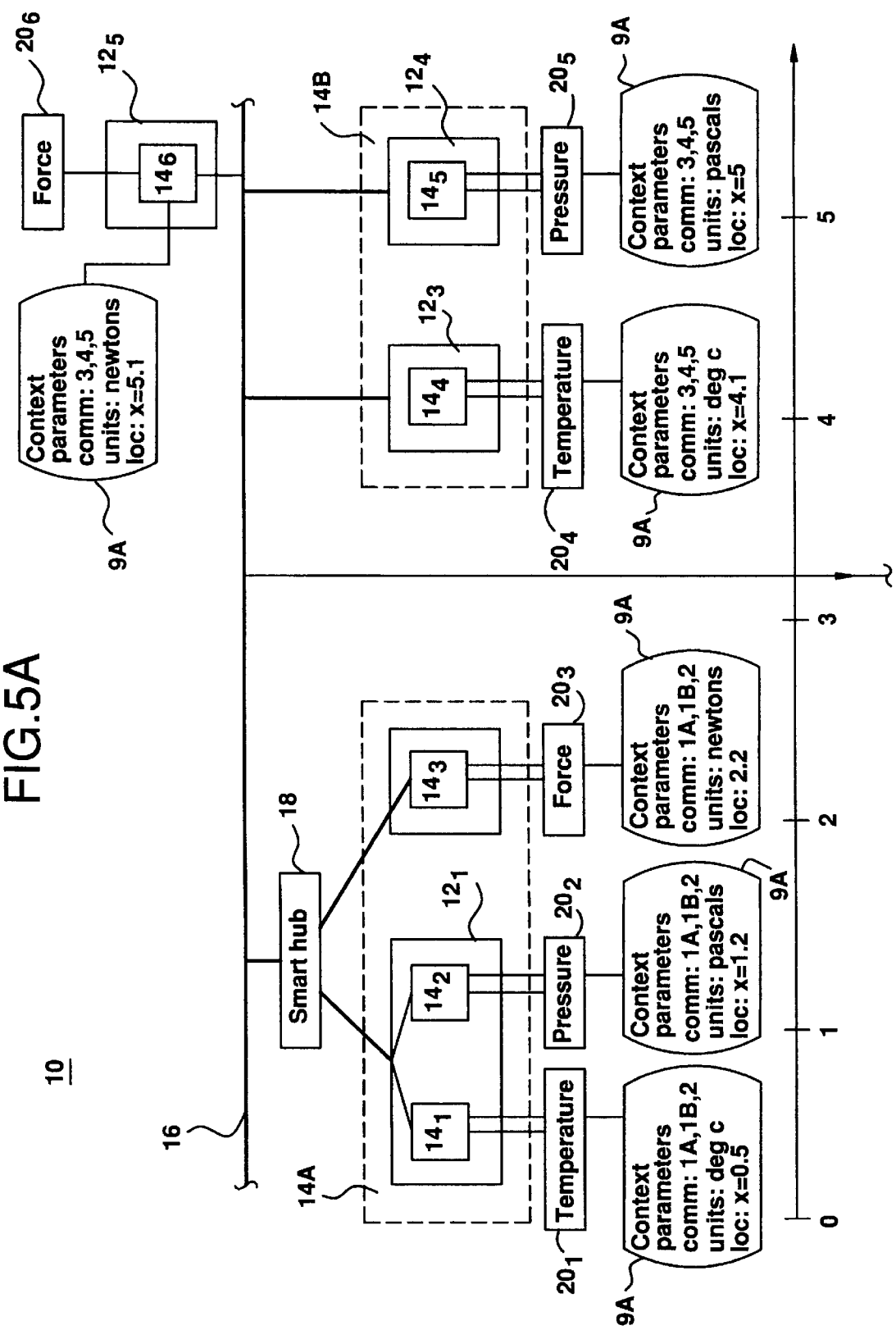
FIG. 5 illustrates the option of directly using the context parameters as the information tag.

FIG. 5 shows one option of how this information is used to determine the actual bindings. These bindings are determined in a three step process. First, the specification 40for the bindings are acquired by each node application $14_x$ from a broadcast message over the network or by being present in components by design. Typical specification are shown in pseudocode. Thus, the GUI name, used by applications displaying information, and the various tags are defined in terms of the context parameters. All interested node applications, as defined by the design, receive these specifications, e.g. all node applications with associated transducers measuring pressure will need specification 1 except for the GUI portion. Only nodes which also have display functionality would use the GUI portion of specification 1. Second, the context parameters are acquired and the tags defined in the specification are constructed at each node application $14_x$. Third, these tags attached to the data placed on the network as shown in the operational message examples. In this example, the context parameter values specified are used as the tags. Recipients accept only messages with the tags that match the specifications.

FIG. 6 illustrates an alternate embodiment for of how the data is used to determine the actual bindings. A UUID, generated by well-known techniques, is used as the tag that accompanies each packet of data. An additional step in the binding process outline above is required, as shown in the "binding message" 42 section of FIG. 6. After the bindings are locally determined using the specification, a UUID is generated for each type of data defined in the specification. A separate binding message 42 is broadcast to inform other nodes that the single UUID defines a selected constraint pattern match.

The process defined allows the binding to be done automatically without manual entry if the appropriate context parameters are acquired and constrained. Even if full binding is not possible using this process, the amount of data needed to be manually entered can be greatly reduced thus eliminating potential errors.

I claim:

1. A method for establishing the communication patterns in a distributed measurement and control system having multiple system nodes comprising the steps of:

specifying a set of global context parameters;

specifying for each system node, the local communication binding constraints based on the global context parameters, wherein the global context parameters describe the logical relationships inherent in an application, the local communication binding constraints describes local logical restrictions on the global context parameters that define the local specification of the communication patterns;

distributing this information to the system nodes affected by the global context parameters and local communication binding constraints;

acquiring the values of the context parameters pertaining to each of the multiple nodes; and applying the acquired values of the context parameters to the local communication binding constraints of each of the multiple nodes to identify data communication patterns for a defined set of applications.

2. A method for establishing communication patterns, as defined in claim 1, the step of acquiring the values of the context parameters further comprising the steps of:

sampling for the context parameter; and measuring a response from the environment.

3. A method for establishing communication patterns, as defined in claim 2, wherein the context parameter is selected from a group comprising location, time, network connectivity, units of an attached transducer.

4. A method for establishing communication patterns, as defined in claim 2, wherein the steps of:

sampling for the context parameter comprises the step of emitting a test signal; and measuring a response from the environment comprises the step of receiving a return signal.

5. A method for establishing communication patterns, as defined in claim 1, wherein a defined set of applications is a collection of application that behave in concert.

6. A method for establishing communication patterns, as defined in claim 1, wherein the step of identifying communication patterns for a defined sets of applications comprises the step of attaching the values of the context parameters to the data as part of the message.

7. A method for establishing communication patterns, as defined in claim 1, wherein the step of identifying data communication patterns for a defined set of applications comprises the steps of:

generating a UUID for each defined data set form, associating the context parameters to the UUID, posting a message identifying this association to all potentially interested applications; and attaching the UUID to the data as part of the message.

8. A distributed control and measurement system for establishing communication patterns comprising:

a node application having a set of global context parameters, wherein the global context parameters describe the logical relationships inherent the node application;

at least two system nodes, each node including,
local communication binding constraints based on the global context parameters, wherein the local communication binding constraints describe local logical restrictions on the global context parameters that define the local specification of the communication pattern,
wherein this information is distributed to the system nodes affected by the global context parameters and local communication binding constraints,
a sampler, being operative to detect the values of the global context parameters that pertain to each of the system nodes, and
a processor, connected to sampler and node application, applies the acquired values of the global context parameters to the local communication binding constraints to identify data communication patterns for the node application.

9. A node, as defined in claim 8, wherein:

the sampler is a bar code reader, and the context parameter is a bar code.

10. A node, as defined in claim 8, wherein:

the sampler emits an acoustic test signal; and the context parameter is measured by the node based on a response to the test signal.

11. A node, as defined in claim 8, wherein the context parameter is selected from a group comprising location, time, network connectivity, units of an attached transducer.

* * * * *